(12) United States Patent
Li et al.

(10) Patent No.: US 10,906,804 B2
(45) Date of Patent: Feb. 2, 2021

(54) DEVICES AND METHODS FOR HYDROGEN GENERATION VIA AMMONIA DECOMPOSITION

(71) Applicants: GAS TECHNOLOGY INSTITUTE, Des Plaines, IL (US); UNIVERSITY OF SOUTH CAROLINA, Columbia, SC (US)

(72) Inventors: Shiguang Li, Mount Prospect, IL (US); Miao Yu, Pittsford, NY (US)

(73) Assignees: GAS TECHNOLOGY INSTITUTE, Des Plaines, IL (US); UNIVERSITY OF SOUTH CAROLINA, Columbia, SC (US)

(*) Notice: Subject to any disclaimer, the term of this patent is extended or adjusted under 35 U.S.C. 154(b) by 0 days.

(21) Appl. No.: 16/057,071

(22) Filed: Aug. 7, 2018

(65) Prior Publication Data
US 2019/0039887 A1 Feb. 7, 2019

Related U.S. Application Data

(60) Provisional application No. 62/541,962, filed on Aug. 7, 2017.

(51) Int. Cl.
*C01B 3/04* (2006.01)
*B01J 8/02* (2006.01)

(52) U.S. Cl.
CPC ............ *C01B 3/047* (2013.01); *B01J 8/0278* (2013.01); *B01J 8/0285* (2013.01); *B01J 8/0292* (2013.01);
(Continued)

(58) Field of Classification Search
CPC ................ C01B 3/047; B01J 8/0278
(Continued)

(56) References Cited

U.S. PATENT DOCUMENTS 2,911,057 A * 11/1959 Hill .................. C01B 3/501
96/8
3,198,604 A 8/1965 Pfefferle
(Continued)

OTHER PUBLICATIONS

Catalytic Decomposition of Ammonia in a Membrane Reactor A thesis by John P. Collins, Oregon State University pp. 1-209 (Year: 1993).*

(Continued)

*Primary Examiner* — Douglas B Call
(74) *Attorney, Agent, or Firm* — Pauley Erickson & Swanson

(57) ABSTRACT

Systems and methods for hydrogen generation via ammonia decomposition that utilize a fixed bed reactor configured to receive inflows of $NH_3$ and oxidant and to produce an outflow of high purity $H_2$. The fixed bed reactor contains a fixed bed of a $NH_3$ decomposition catalyst wherewith the $NH_3$ decomposes to form $N_2$ and $H_2$; a plurality of ceramic hollows fibers with a high surface to volume ratio disposed in the fixed bed, the hollow fibers having an $H_2$ selective membrane disposed thereon for extracting $H_2$ from $N_2$ and to form a permeate of the high purity $H_2$ and a retentate of primarily $N_2$; and a catalytic $H_2$ burner also disposed in the fixed bed, the catalytic $H_2$ burner for burning a portion of the $H_2$ with the oxidant to provide thermal energy for the $NH_3$ decomposition.

12 Claims, 4 Drawing Sheets

(52) U.S. Cl.
CPC .............. *B01J 2208/00504* (2013.01); *B01J 2208/027* (2013.01); *C01B 2203/84* (2013.01)

(58) Field of Classification Search
USPC ..................................................... 423/658.2
See application file for complete search history.

(56) References Cited

U.S. PATENT DOCUMENTS

| | | |
|---|---|---|
| 3,730,774 A | 5/1973 | McKee et al. |
| 8,709,132 B1 | 4/2014 | Elkind |
| 2002/0028171 A1 | 3/2002 | Goetsch et al. |

OTHER PUBLICATIONS

Triple-layer catalytic hollow fiber membrane reactor for hydrogen production. Thawatchai Maneerung et al. J. of Membrane Science, V514, pp. 1-14 (Year: 2016).*
Gouveia Gil, "Catalytic Hollow Fibre Membrane Reactors for H2 Production," Imperial College London, Department of Chemical Engineering, 3 pages, Feb. 2015.
U.S. Patent Office, English language version of the International Search Report, Form PCT/ISA/210 for International Application PCT/US2018/45621, dated Oct. 22, 2018 (2 pages).
U.S. Patent Office, English language version of the Written Opinion of the International Searching Authority, Form PCT/ISA/237 for International Application PCT/US2018/45621, dated Oct. 22, 2018 (4 pages).

* cited by examiner

DEVICES AND METHODS FOR HYDROGEN GENERATION VIA AMMONIA DECOMPOSITION

CROSS REFERENCE TO RELATED APPLICATION

This application claims the benefit of U.S. Provisional Patent Application, Ser. No. 62/541,962, filed on 7 Aug. 2017. The Provisional Application is hereby incorporated by reference herein in its entirety and is made a part hereof, including but not limited to those portions which specifically appear hereinafter.

GOVERNMENT RIGHTS

This invention was made with government support under Contract No. DE-AR0000931 awarded by the U.S. Department of Energy. The government has certain rights in the invention.

BACKGROUND OF THE INVENTION

Field of the Invention

This invention relates generally to hydrogen generation and, more particularly, to hydrogen generation via ammonia decomposition including devices, systems and methods particularly suited therefore.

Description of Related Art

There is a need and demand for hydrogen generation from a carbon neutral liquid fuel (CNLF) with high yield and sufficient purity for use in commercial proton exchange membrane (PEM) fuel cells. Required metrics, set by the US Department of Energy (DOE) Advanced Research Projects Agency-Energy (APRA-E), for such hydrogen generation include:
  Conversion to hydrogen>99%
  $H_2$ generation rate>0.15 g/h/cm$^3$
  Energy efficiency>80%
  Maximum $NH_3$ decomposition reactor temperature of 450° C.
  Hydrogen delivered cost at target pressure (30 bar)<$4.5/kg It is very challenging for existing $NH_3$ cracking technologies to meet these metrics due to a variety of facts and factors, including:
  Low reaction temperature (<450° C.) and high $NH_3$ pressure (10~15 bar) limit $NH_3$ conversion to less than 95%;
  $NH_3$ decomposition is an endothermic reaction and thus requires energy input; and
  The cracked $H_2$ is mixed with $N_2$, which decreases the efficiency of the PEM fuel cell. For example, with 60% dilution with $N_2$, current density may decrease 8~30% at 60° C.

Apollo Energy System Inc. (USA) designed an $NH_3$ cracking device to generate $H_2$ for fuel cells. $H_2$-containing anode off gas was used as a fuel for combustion to provide thermal energy for the cracker. Conversion to $H_2$ was high (99.99%) due to the high reactor temperature (480~660° C.). The energy efficiency was not reported, but it is likely high due to the efficient use of thermal energy from $H_2$ combustion for reactor heating. An efficient commercial catalyst (70 wt % Ni on $Al_2O_3$) modified with Ru was used. Therefore, a high $H_2$ generation rate was also obtained. Membrane reactors have been studied for $H_2$ generation from $NH_3$ decomposition. However, the technology is still at the early research stage, and both the Hz generation rate and conversion to $H_2$ are much lower than ARPA-E's targets (see Table 1).

SUMMARY OF THE INVENTION

The present development is expected to solve at least some and preferably each of the above-identified intrinsic issues and desirably satisfy at least some and preferably each of the above-identified metrics.

The present development can be adopted for providing high purity $H_2$ at high rate and low cost from $NH_3$ decomposition for PEM fuel cell application as well as significantly reducing fuel transportation and storage cost. As detailed below, the subject novel compact membrane reactor also allows the use of $NH_3$ as an effective $H_2$ source for many other potential applications that utilize $H_2$ fuel. This may lead to entirely new markets. Furthermore, via this platform, $NH_3$ can be effectively coupled with maturing $H_2$ utilization technologies, allowing it becoming a new generation of fuel for wide applications.

Systems and methods in accordance with selected aspects of the subject development can advantageously employ a membrane reactor containing: a low-cost, highly active catalyst for $NH_3$ decomposition, an $H_2$ selective membrane on ceramic hollow fibers with high surface to volume ratio for extracting Hz from $N_2$ (simultaneously shifting $NH_3$ decomposition reaction), and a catalytic $H_2$ burner to provide thermal energy for $NH_3$ decomposition.

A system for generating hydrogen via ammonia decomposition in accordance with specific embodiment of the subject invention development desirably includes a fixed bed reactor configured to receive inflows of $NH_3$ and oxidant and to produce an outflow comprising high purity $H_2$. The fixed bed reactor includes or contains a fixed bed of a $NH_3$ decomposition catalyst wherewith the $NH_3$ decomposes to form $N_2$ and $H_2$; a plurality of ceramic hollows fibers with a high surface to volume ratio disposed in the fixed bed, the hollow fibers having an $H_2$ selective membrane disposed thereon for extracting $H_2$ from $N_2$ and to form a permeate comprising the high purity $H_2$ and a retentate comprising primarily $N_2$; and a catalytic $H_2$ burner also disposed in the fixed bed, the catalytic $H_2$ burner for burning a portion of the Hz with the oxidant to provide thermal energy for the $NH_3$ decomposition.

A method for generating hydrogen via ammonia decomposition in accordance with one aspect of the development involves introducing ammonia into such a membrane reactor so as to decompose at least a portion of the ammonia to form ammonia decomposition products including hydrogen gas and then separating at least a portion of the hydrogen gas from the decomposition products.

In one embodiment, a method for generating hydrogen via ammonia decomposition is provided that involves introducing and decomposing ammonia to form hydrogen and then separating and recovering high purity hydrogen via a specified fixed bed reactor system. More particularly, the fix bed reactor system includes a fixed bed membrane reactor that contains a fixed bed of a $NH_3$ decomposition catalyst for $NH_3$ decomposition to form $N_2$ and $H_2$. The reactor also includes a plurality of ceramic hollows fibers having a high surface to volume ratio disposed in the fixed bed. The hollow fibers have an $H_2$ selective membrane disposed thereon for extracting $H_2$ from $N_2$ and to form a permeate comprising high purity $H_2$ and a retentate comprising primarily $N_2$. The reactor further includes a catalytic $H_2$ burner also disposed in the fixed bed. The catalytic $H_2$ burner is adapted and effective for burning a portion of the $H_2$ to provide thermal energy for the $NH_3$ decomposition. Thus, the step of decomposing at least a portion of the ammonia is desirably achieved via the fixed bed of the $NH_3$ decomposition catalyst and thermal energy produced or provided by the catalytic $H_2$ burner to form ammonia decomposition products including $H_2$. The plurality of ceramic hollows fibers having a high surface to volume ratio disposed in the fixed bed desirably serve to and are effective to separate and recover high purity hydrogen from the decomposition products.

BRIEF DESCRIPTION OF THE DRAWINGS

Objects and features of this invention will be better understood from the following description taken in conjunction with the drawings, wherein.

DETAILED DESCRIPTION

The subject development provides a novel compact intensive and modular $NH_3$ decomposition ($2NH_3 \leftrightarrow N_2+3H_2$) device with high conversion and high energy efficiency (>70%) at relatively low temperature (<450° C.).

An exemplary system or device in accordance with the subject development is expected to generate high purity $H_2$ at high rate from close-to-complete $NH_3$ conversion, in a small reactor volume.

Figure 1:
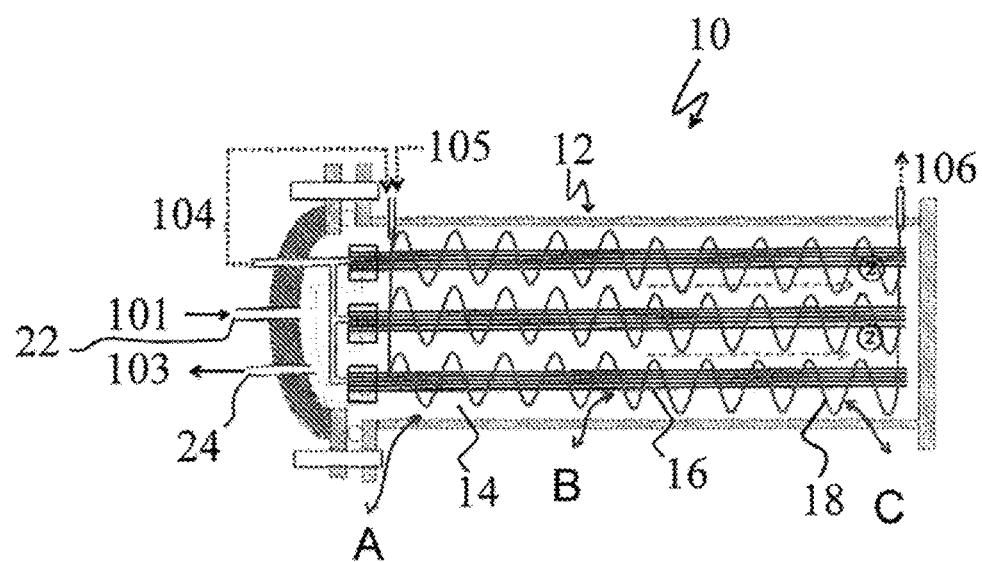
FIG. 1 is a simplified schematic of a system for generating hydrogen via ammonia decomposition and more particularly a membrane reactor for $H_2$ generation via thermal catalytic $NH_3$ decomposition in accordance with one aspect of the subject development.
Figure 2:
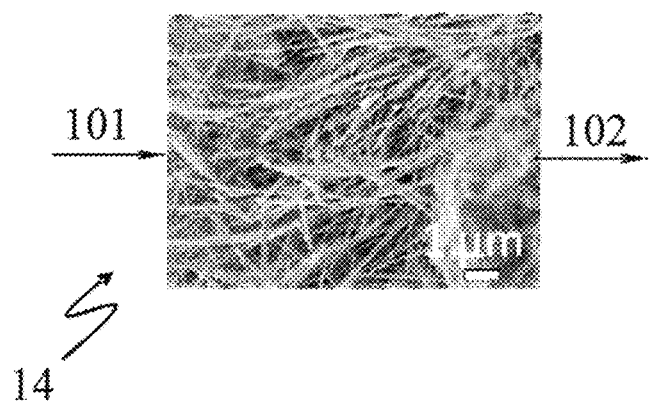
FIG. 2 is a photomicrograph of designated portion A shown in FIG. 1, e.g., low-cost, highly active Ru-based catalyst for $NH_3$ decomposition contained within the membrane reactor in accordance with one aspect of the subject development.

A system or device for generating hydrogen via ammonia decomposition, generally designated by the reference numeral 10 and in accord with one embodiment of the subject development, is shown in FIG. 1. The system 10 includes a membrane reactor 12 that includes or comprises three key components: i) a fixed bed of low-cost, highly active catalyst for $NH_3$ decomposition, generally designated by the reference numeral 14 and more specifically shown in FIG. 2, ii) an $H_2$ selective membrane on ceramic hollow fibers with high surface to volume ratio, generally designated by the reference numeral 16, for extracting $H_2$ from $N_2$ and simultaneously shifting $NH_3$ decomposition reaction, more specifically shown in FIG. 3 and a catalytic $H_2$ burner to provide thermal energy for $NH_3$ decomposition, generally designated by the reference numeral 18 and more specifically shown in FIG. 4.

Figure 3:
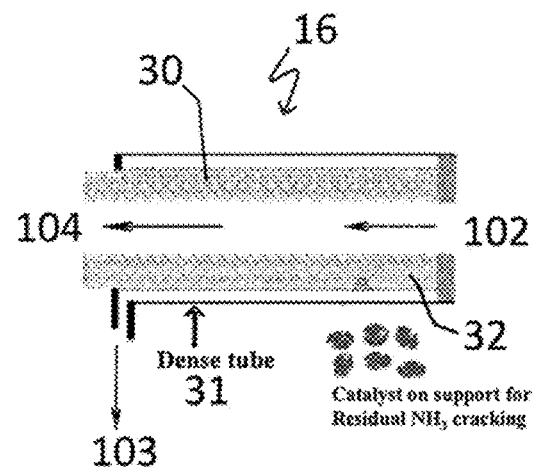
FIG. 3 is a simplified schematic representation of designated portion B shown in FIG. 1, e.g., showing an $H_2$ selective membrane on ceramic hollow fibers with high surface to volume ratio for extracting $H_2$ from $N_2$ (simultaneously shifting $NH_3$ decomposition reaction) in accordance with one aspect of the subject development.

In these figures, certain of the process streams are identified as follows:
101 Feed—$NH_3$
102 Cracked stream—$N_2+H_2$ (~75%)
103 Product—$H_2$ (high purity)
104 Membrane retentate—$N_2+H_2$ (~25%)
105 Air—feed to the catalytic burner
106 Side product—$N_2+H_2O$ As shown in FIGS. 1-4, a feed stream of $NH_3$ 101 is introduced into the membrane reactor 12 such as through an inlet 22. In the reactor 12, the $NH_3$ contacts the $NH_3$ decomposition catalyst fixed bed 14 and undergoes decomposition/cracking to form nitrogen ($N_2$) and hydrogen ($H_2$) gas, see FIG. 2. The 142 selective membrane on ceramic hollow fibers with high surface to volume ratio 16 serve to separate or extract $H_2$ from $N_2$ from the cracked stream, stream 102, see FIG. 3, and form a stream 103 of high purity $H_2$ such as discharged or recovered from the reactor, such as via the product outlet 24. Suitable ceramic hollow fibers includes aluminum hollow fibers but other ceramic materials such as known to those in the art can be used, if desired. As shown, catalyst can desirably be loaded on the external surface of the hollow fibers 30. As shown in FIG. 3, the ceramic hollow fibers 30 in a dense tube 31, e.g., stainless steel tube, wherethrough the $H_2$ permeate is recovered, stream 103, and the membrane retentate is passed on, stream 104. As shown in FIG. 3, active catalyst 32 can also be loaded in the ceramic hollow fibers 30 to assist in the decomposition residual $NH_3$.

Figure 4:
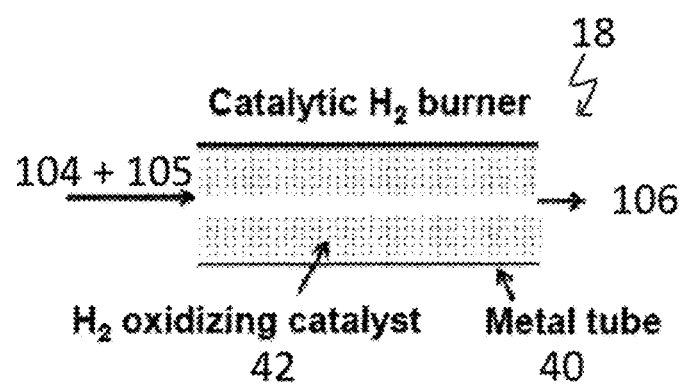
FIG. 4 is a simplified schematic representation of designated portion C shown in FIG. 1, e.g., a catalytic $H_2$ burner to provide thermal energy for $NH_3$ decomposition in accordance with one aspect of the subject development.

As noted above, the reactor 12 includes and/or contains a catalytic $H_2$ burner 18 such as to provide thermal energy for $NH_3$ decomposition. As shown in FIG. 4, the catalytic $H_2$ burner 18 can desirably be formed of or include a metal tube 40 such as containing a $H_2$ oxidizing catalyst 42, such as known in the art. As shown in FIG. 1 and FIG. 4, the catalytic $H_2$ burner 18 desirably serves to burn a portion of the produced $H_2$ (for example, such as hydrogen in the membrane retentate, stream 104 reacting with via intake oxidant, e.g., air, such as stream 105) to provide thermal energy for the $NH_3$ decomposition.

The subject development can and desirably does provide or result in the following advantages/characteristics:
  Pressurized $NH_3$ vapor at 10~15 bar (stream 101) will be used directly as feedstock;
  Low-cost, highly active catalysts (for example, ruthenium-based $NH_3$ decomposition catalysts such as known in the art or other suitable $NH_3$ decomposition catalysts such as known in the art) will be used in a compact fixed bed reactor for high rate $NH_3$ decomposition ($2NH_3 \leftrightarrow N_2+3H_2$) at reaction temperature below 450° C.;
  $H_2$ selective membrane on ceramic hollow fibers with high surface to volume ratio will be used as a reactor boundary to extract high purity $H_2$ from the reaction product; the removal of the $H_2$ will also shift the reaction towards higher conversion;
  If needed, active catalyst will also be loaded in the ceramic hollow fiber to decompose residual $NH_3$;
  Lower concentration residual $H_2$ in the retentate (stream 104) will be burned with air in a catalytic burner to provide thermal energy uniformly needed for $NH_3$ decomposition;

Permeated high purity $H_2$ (stream 103) and exhaust from catalytic $H_2$ combustion (stream 106) at elevated temperature will be used to preheat $NH_3$ feed (stream 101); and High purity $H_2$ (>99%) (stream 103) after heat exchange will be compressed for applications.

Table 1, below, shows a comparison of the invention with current and emerging technologies for $H_2$ generation from thermocatalytic $NH_3$ decomposition and also with the ARPA-E technical targets.

TABLE 1

Comparison between technologies and ARPA-E technical performance targets

| Description | ARPA-E target | Apollo Energy System[1] | Bimodal catalytic membrane reactor (BCMR)[3] | Palladium membrane reactor[4] | Invention membrane Reactor |
|---|---|---|---|---|---|
| $H_2$ delivered cost at target pressure | <$4.5/kg | N/A | N/A | N/A | $4.078/kg |
| Final prototype size, L $H_2$/min | 10 | 7.5 | 0.044 | 0.081 | 10 |
| $H_2$ generation rate, g $H_2$/h/cm³ | >0.15 | 0.126 | 0.038 | 0.0144 | 0.2 |
| Conversion to $H_2$ | >99% | >99.99% | 74% | 85% | >99% |
| Energy efficiency | >80% | N/A | N/A | N/A | 88.45% |
| Maximum cracking temperature, ° C. | 450 | 480~660 | 400~450 | 500~600 | 450 |
| $H_2$ delivered pressure, bar | 30 | 1 | 0.005 | 1 | 30 |
| Life time (projected), yrs | 10 | N/A | N/A | N/A | 10 |
| Concentration of catalyst poisoning impurities | <100 ppb | <100 ppm[a] | $NH_3$ (4.5%) | <0.8% | <100 ppb |

N/A: not available;
[a]calculated based on reported conversion;

As identified above, Apollo Energy System Inc. (USA) designed an $NH_3$ cracking device to generate $H_2$ for fuel cell. $H_2$-containing anode off gas was used as a fuel for combustion to provide thermal energy for the cracker. Conversion to $H_2$ was high (99.99%) due to the high reactor temperature (480~660° C.). The energy efficiency was not reported, but it is likely high due to the efficient use of thermal energy from $H_2$ combustion for reactor heating. An efficient commercial catalyst (70 wt % Ni on $Al_2O_3$) modified with Ru was used. Therefore, a high $H_2$ generation rate was also obtained. Membrane reactors have been studied for $H_2$ generation from $NH_3$ decomposition.[9][10] However, the technology is still at the early research stage, and both the $H_2$ generation rate and conversion to $H_2$ are much lower than ARPA-E's targets (Table 1).

HYSYS simulation/calculations (Examples 1 and 2) show that the subject development is expected to have high $H_2$ production rate, low $H_2$ delivered cost at target pressure, and high energy efficiency at 400° C., as shown in Table 1. The lower reaction temperature is expected to extend the lifetimes of both membrane and catalyst. $NH_3$ conversion is expected to be higher than 99% due to the equilibrium reaction shifting by selective $H_2$ extraction. Overall, compared with existing technologies, the subject development can or does result in the following advantages:

Rational and modular design of well-integrated catalyst, membrane and $H_2$ burner;

High performance of three key components as supported by our preliminary results;

Lower operation temperature (350-450° C.) while close-to-complete $NH_3$ decomposition;

High $H_2$ purity (>99%); and

Higher energy efficiency and much smaller equipment size (meaning smaller footprint).

Ammonia, as a promising CNLF and an effective $H_2$ source, can be synthesized from air and water ($N_2$ extracted from air and $H_2$ from water) using renewable energy sources. To produce $H_2$ as an intermediate, it is essential to develop effective and economic $NH_3$ decomposition technologies. The subject development (such as represented the system schematic shown in FIG. 1) represents a new and innovative solution. Its innovativeness is reflected in the following aspects:

Low-cost, highly active catalysts for fast $NH_3$ decomposition;

Low-cost highly $H_2$ selective membrane for extracting $H_2$ with purity >99% (simultaneously shifting $NH_3$ decomposition reaction towards conversion >99%);

Catalytic $H_2$ burner embedded in the reactor for providing thermal energy for $NH_3$ decomposition to achieve overall energy efficiency as high as 88%; and Membrane in a high packing-density (high surface to volume ratio) hollow fiber configuration capable of achieving a compact modular system that can be scaled up linearly by just adding additional membrane modules.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Example 1

Calculation of $H_2$ Production Rate in the Membrane Reactor

Figure 5:
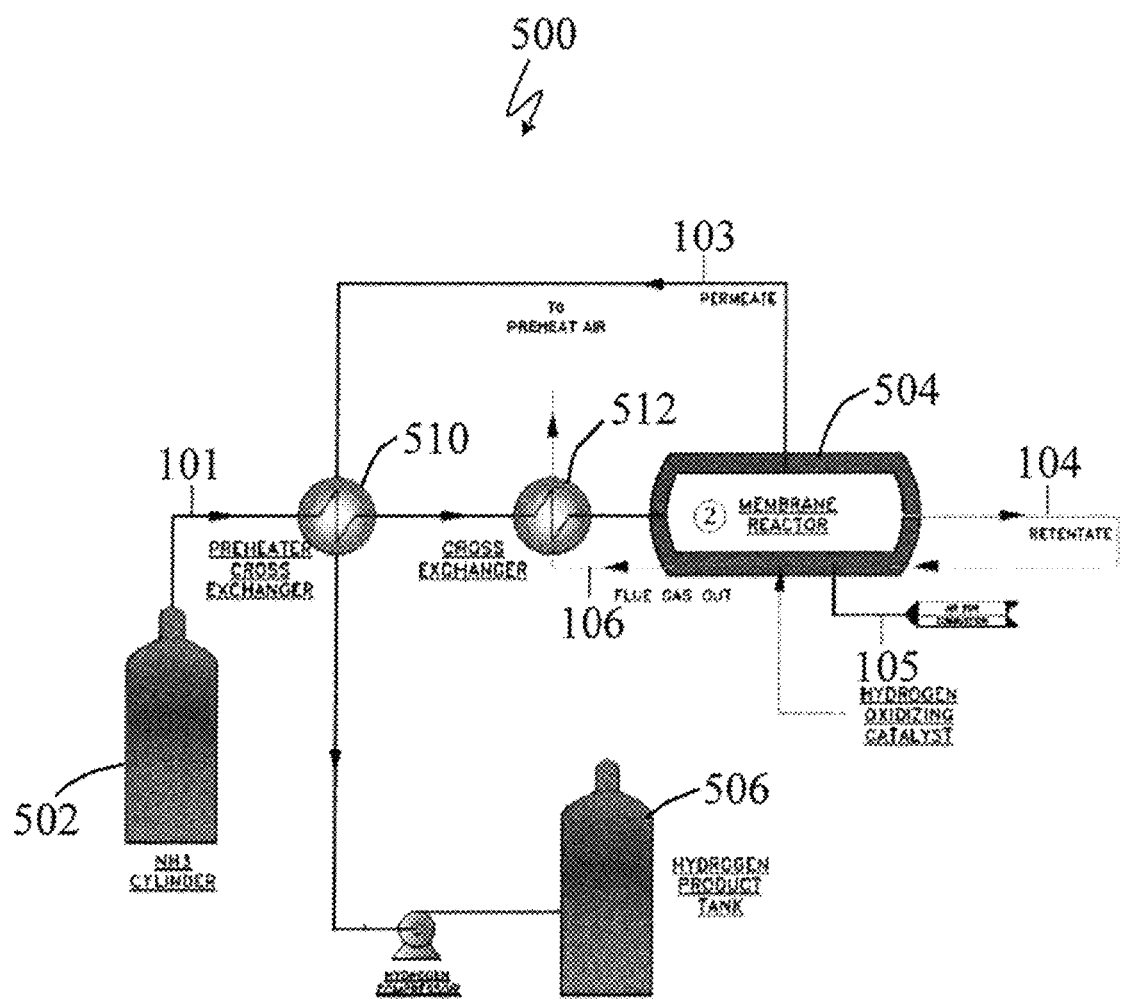
FIG. 5 is a simplified schematic of an $H_2$ production test system in accordance with one aspect of the subject development and referenced in Example 1.

FIG. 5 illustrates an $H_2$ production test system 500 in accordance with one aspect of the subject development. The system 500 includes a $NH_3$ supply source such as an $NH_3$ cylinder 502, a membrane reactor 504 system such as described above, and a hydrogen product storage, such as a hydrogen product tank 506. The system 500 further include a preheater cross heat exchanger 510 and a cross heat exchanger 512 such as to appropriately preheat the feed (e.g., stream 101) to the membrane reactor 502 and to recover heat from the hydrogen product (stream 103) and the reactor flue gas (stream 106), respectively.

The system 500 shows the $NH_3$ feed stream (stream 101 at 25° C., 10 bar and a feed rate of 0.3434 mol/min), permeate stream (stream 103 at 400° C., 2.5 bar, the permeate composed of $H_2$ at 0.4464 mol/min=10 L/min and $N_2$ at 0.004509 mol/min), and retentate stream (stream 104 at 400° C., 2.5 bar, the retentate composed of that 0.0687 mol/min and $N_2$ at 0.1673 mol/min) and the membrane reactor 504 operating at 400° C.

$H_2$ production rate: 10 L $H_2$/min
Input:
Catalyst:
K-promoted Ru/γ-$Al_2O_3$
Catalytic activity at 400° C.: 4.5 mmol $H_2$/min/g catalyst
Packing density: 1 g/cm$^3$
Membrane:
Composite SAPO-34 membrane on hollow fiber (1.5 mm od) housed in metal tube (2 mm od×1.6 mm id)
$H_2$ permeance at 400° C.: $1.5 \times 10^4$ mol/(m$^2$·s·Pa)
$H_2$/$N_2$ selectivity: >700
Catalytic $H_2$ burner:
Pt-impregnated Ni foam
Heat transfer rate: 1.5 kcal/(cm$^2$·h)
Output:
Catalyst volume: 116 cm$^3$
Membrane area: 0.2 m$^2$
Membrane volume: 133 cm$^3$
Catalytic $H_2$ burner volume: 10 cm$^3$ (estimated from energy needed for decomposing $NH_3$ feed)
Estimated top space of the membrane reactor: 10 cm$^3$
Total membrane reactor volume: 269 cm$^3$
Calculated $H_2$ generation rate: 0.20 g $H_2$/h/cm$^3$ Example 2

Energy Efficiency Calculation Using HYSYS Simulation

Figure 6:
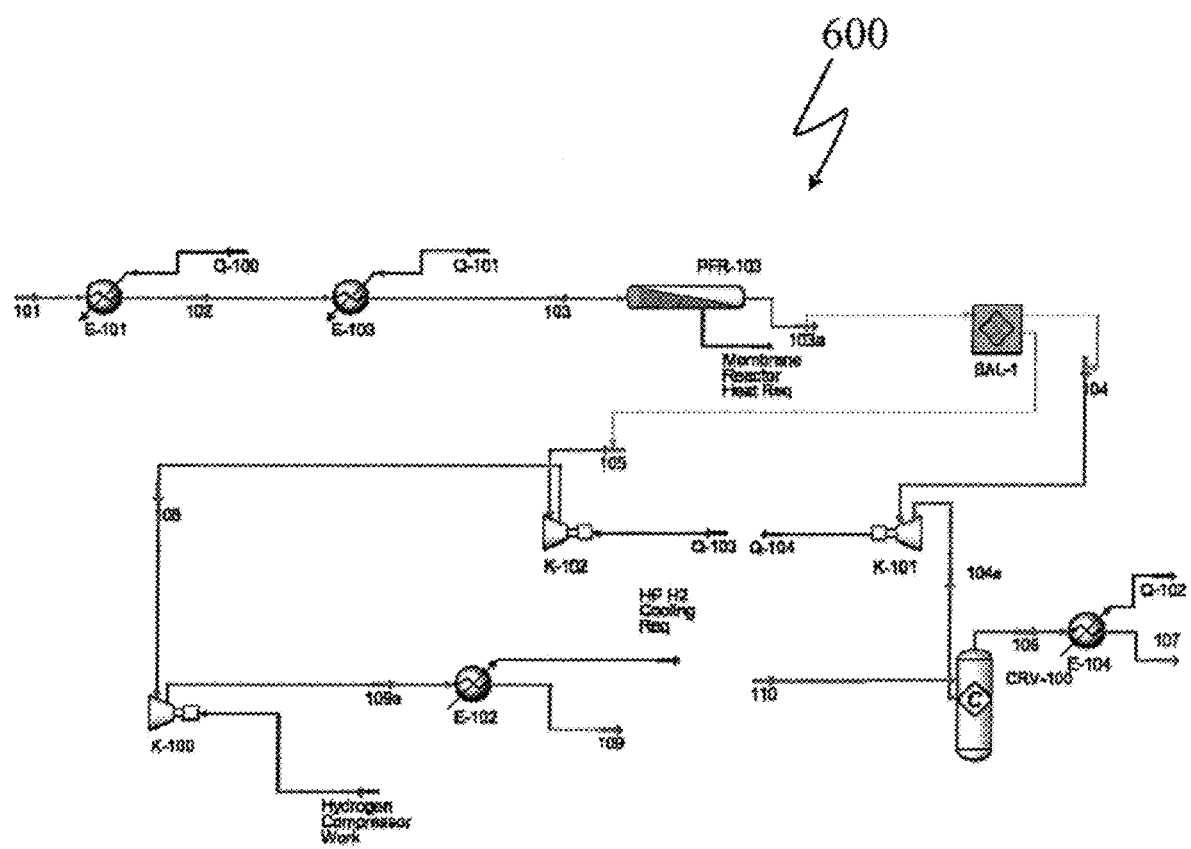
FIG. 6 is a simplified schematic of an HYSIS simulation system referenced in Example 2.

Referencing the HYSIS simulation system 600 shown in FIG. 6.
HYSYS Flow Diagram:
Stream and Energy Summary:
$H_2$ production: 10 L (STP)/min and at delivery pressure of 30 bar $$\text{Energy Efficiency}(EE) = \frac{P}{P+E} = \frac{0.0271 \times 2 \times 33.3}{0.0271 \times 2 \times 33.3 + 848.7018/3600} = 88.45\%$$

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed includes:

1. A system for generating hydrogen via ammonia decomposition, the system comprising:
    a fixed bed of a $NH_3$ decomposition catalyst configured to receive inflows of $NH_3$ and wherewith the $NH_3$ decomposes to form a combined stream of $N_2$ and $H_2$;
    a plurality of spaced apart and longitudinally aligned ceramic hollow fibers, each of the plurality of spaced apart and longitudinally aligned ceramic hollow fibers including an $H_2$ selective membrane disposed thereon for extracting $H_2$ from the combined stream of $N_2$ and $H_2$ and to form a permeate comprising a high purity $H_2$ and a retentate comprising primarily $N_2$; and
    a catalytic $H_2$ burner extending through the fixed bed, the catalytic $H_2$ burner comprising a metal tube containing a $H_2$ oxidizing catalyst therein and configured to receive and burn at least a portion of the retentate to provide thermal energy for the $NH_3$ decomposition.

2. The system of claim 1 wherein the retentate additionally comprises an amount of $H_2$ and wherein at least a portion of the retentate and an oxidant inflow are introduced into the catalytic $H_2$ burner within the fixed bed reactor to provide thermal energy for the $NH_3$ decomposition.

3. The system of claim 1, therein the $H_2$ burner comprises a spiral tube configuration extending through the fixed bed.

4. The system of claim 3, wherein an outlet end of the $H_2$ burner metal tube releases $N_2$ and $H_2O$.

5. The system of claim 1 wherein each of the plurality of spaced apart and longitudinally aligned ceramic hollow fibers comprises a porous ceramic material, and additionally comprising a $NH_3$ cracking catalyst loaded within the porous ceramic material for cracking of residual $NH_3$.

6. The system of claim 5 providing a conversion of ammonia to hydrogen and nitrogen in excess of 99%.

7. The system of claim 1 wherein the plurality of spaced apart and longitudinally aligned ceramic hollow fibers are in a parallel alignment.

8. The system of claim 1, wherein at least a portion of the $NH_3$ decomposition catalyst is disposed around and in a space between adjacent pairs of the plurality of spaced apart and longitudinally aligned ceramic hollow fibers.

9. The system of claim 1 wherein a maximum $NH_3$ decomposition reactor temperature of the fixed bed reactor is no more than 450° C.

10. The system of claim 1 wherein the inflow of $NH_3$ comprises $NH_3$ vapor at 10-15 bar.

11. The system of claim 1 wherein a conversion of ammonia to hydrogen and nitrogen is in excess of 99%.

12. The system of claim 1 additionally comprising a preheater whereby heat provided by at least one stream selected from the group consisting of a stream of permeated high purity $H_2$ and a stream of catalytic $H_2$ combustion exhaust preheats the inflow of $NH_3$ to the fixed bed reactor.

* * * * *